United States Patent [19]

Watanabe

[11] Patent Number: 5,959,618
[45] Date of Patent: *Sep. 28, 1999

[54] IMAGE DISPLAY APPARATUS

[75] Inventor: Ikuo Watanabe, Kanagawa-ken, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/691,445

[22] Filed: Aug. 2, 1996

Related U.S. Application Data

[63] Continuation of application No. 08/249,445, May 26, 1994, abandoned.

[30] Foreign Application Priority Data

Jun. 1, 1993 [JP] Japan .................................. 5-154360

[51] Int. Cl.[6] ..................................................... G09G 5/06
[52] U.S. Cl. ........................................... 345/199; 345/186
[58] Field of Search ..................................... 345/199, 189, 345/113, 115, 186

[56] References Cited

U.S. PATENT DOCUMENTS

| | | | |
|---|---|---|---|
| 4,827,253 | 5/1989 | Maltz | 345/199 |
| 5,283,560 | 2/1994 | Bartlett | 345/113 |

*Primary Examiner*—Regina Liang
*Attorney, Agent, or Firm*—Robin, Blecker & Daley

[57] ABSTRACT

In an image display apparatus arranged to include a bit mapping memory having transparency parameter values and to display images while importing a picture effect to a plurality of image data on the basis of the transparency parameter values, a code memory is arranged to hold transparency parameter codes, and a look-up table is arranged to be used for converting the transparency parameter codes into the transparency parameter values. The image display apparatus is thus arranged to bring forth the picture effect by converting, through the look-up table, the transparency parameter codes into the transparency parameter values to be used for transparency between a plurality of images.

30 Claims, 6 Drawing Sheets

CMEM

IMAGE DISPLAY APPARATUS

This is a continuation under 37 CFR 1.62 of prior application Ser. No. 08/249,445, filed May 26, 1994 now abandoned.

BACKGROUND OF THE INVENTION

1. Field of the Invention

This invention relates to an image display apparatus for storing image data and displaying, on demand, images represented by the image data, and more particularly to an image display apparatus of the kind arranged to display images by switching one image over to another with some picture effect imparted to pictures displayed.

2. Description of the Related Art

Figure 1:
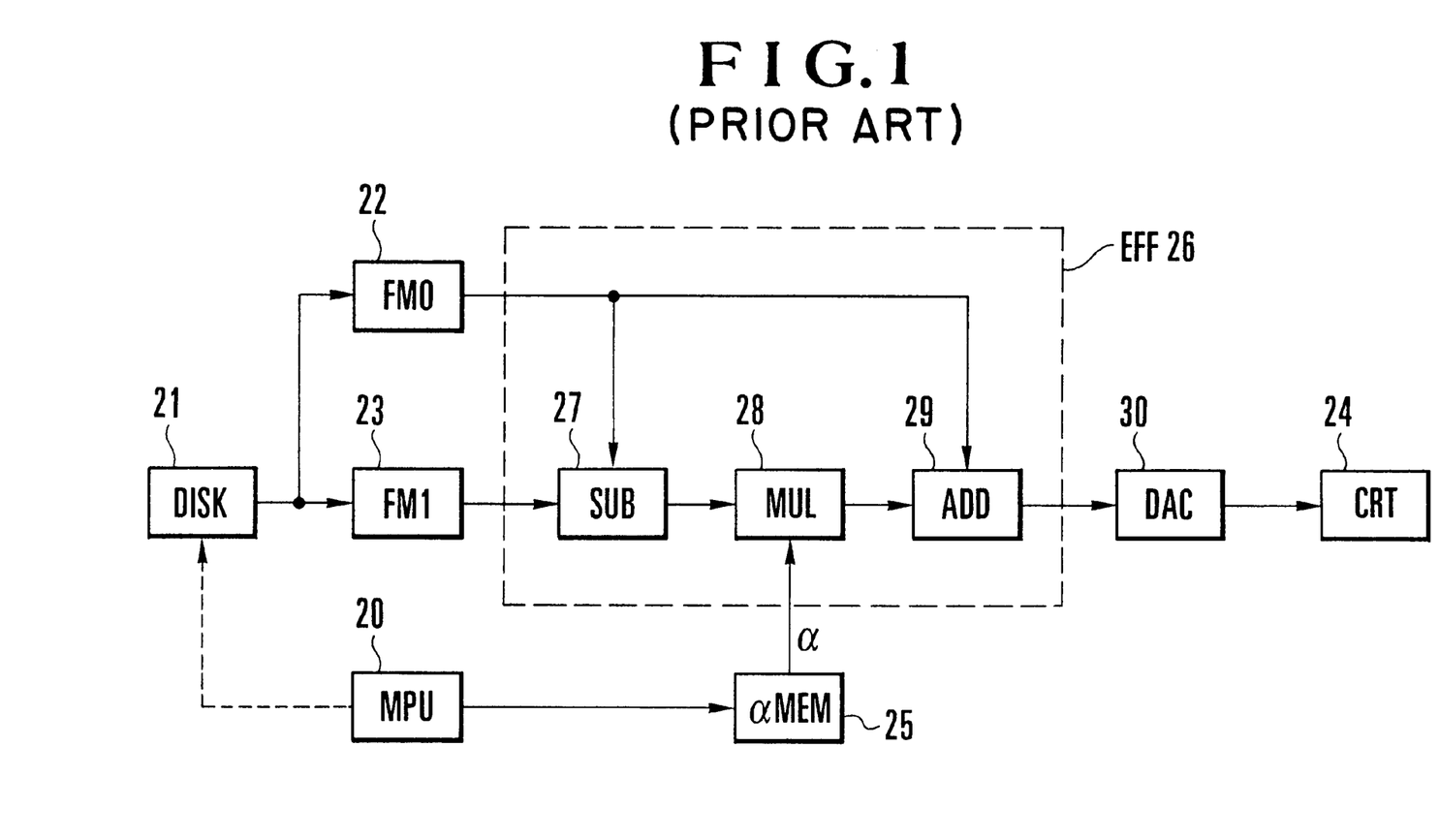
FIG. 1 is a block diagram showing the arrangement of the conventional image display apparatus.

Image display apparatuses of varied kinds have been proposed. A method for forming transparent images conventionally employed in general for still image display apparatuses is described below as follows:

FIG. 1 schematically shows the arrangement of an image display apparatus adopting the conventional method. Referring to FIG. 1, image data is read out from a disk 21 in accordance with instructions from control means (MPU) 20. The image data read out is written into a first frame memory (FM0) 22 and a second frame memory (FM1) 23.

The image data written into the frame memories 22 and 23 is read out at a video display timing to be displayed on a CRT 24. To bring forth a picture effect, the value of a transparency parameter a which is stored for the picture effect in a bit mapping memory (αMEM) 25 is caused to change as desired within a vertical blanking period by the control means 20. With the value of the transparency parameter α thus changed, the values of the image data of the two frame memories 22 and 23 are mixed together by an effector (EFF) 26 before the images are displayed. The transparency parameter α is provided for controlling some image to become semitransparent so as to make other images visible through the semitransparent image and is set to have a decimal value which is variable between "0.0" and "1.0" including some intermediate values.

The effector 26 is composed of a first computing element (SUB) 27, a second computing element (MUL) 28 and a third computing element (ADD) 29 and is arranged to perform a process of mixing the image data read out from the two frame memories 22 and 23 within an arbitrary area and in an arbitrary ratio by carrying out the following computing operation on the image data read out from the frame memories 22 and 23. More specifically, with the output of the effector 26 assumed to be Y, the output of the effector 26 can be expressed as follows:

$$Y=\alpha (FM1-FM0)+FM0=\alpha FM1+(1-\alpha) FM0$$

By changing the value of the transparency parameter a gradually from "0.0" to "1.0", the output Y of the effector 26 gradually varies from the output FM0 of the first frame memory 22 to the output FM1 of the second frame memory 23 in a mixed manner. However, the conventional system such as the one described above has presented the following problem:

In a case where a large number of display picture elements must be converted, the amount of information of the bit mapping memory 25 to be rewritten during the vertical blanking period in bringing forth a picture effect increases. The increased amount of information either cannot be adequately processed, if the control means 20 is of an ordinary capacity, or causes an increase in cost.

To solve this problem, it is conceivable to use a dual-port memory for the bit mapping memory 25 in such a way as to permit rewriting the contents of the bit mapping memory 25 even during the vertical blanking period. Such a solution, however, would lower the quality of the picture effect as it makes an area where change-over takes place for the picture effect discontinuous while the picture effect is in process.

Figure 2:
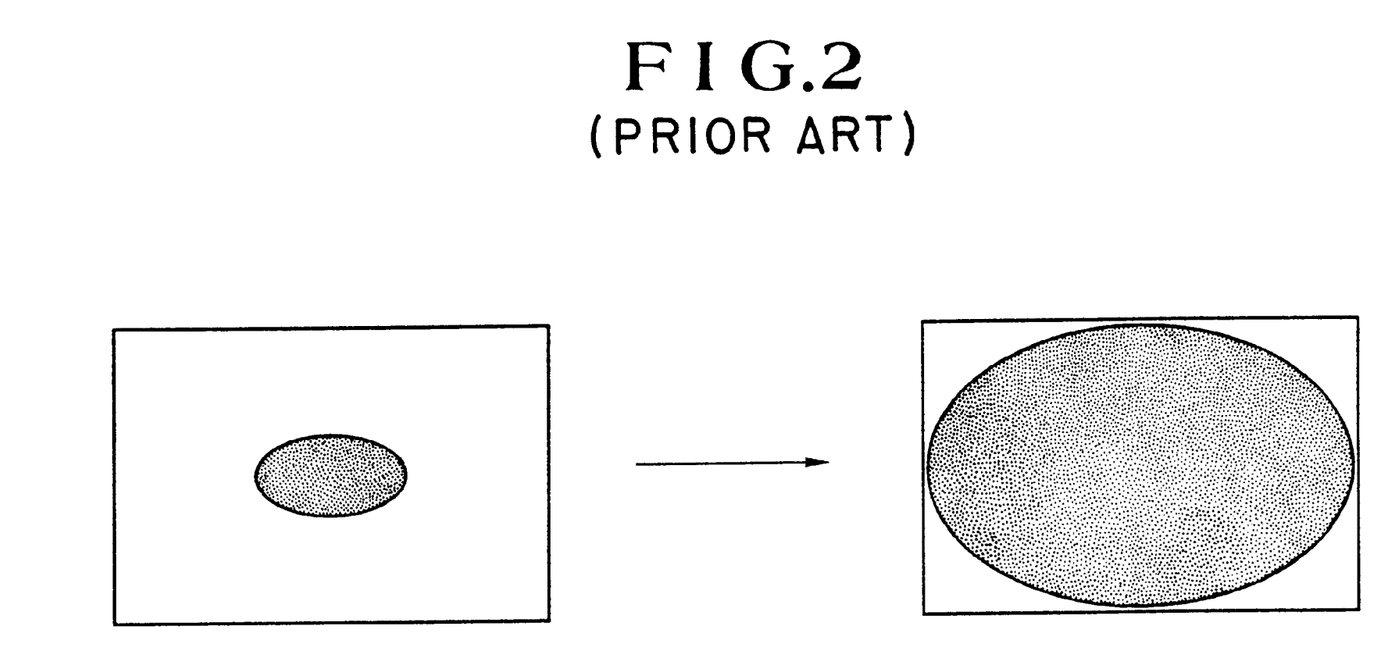
FIG. 2 shows a concentric elliptic wipe effect.

FIG. 2 shows by way of example a case where the value of the transparency parameter is gradually varied from "0" to "1" in a concentric elliptic shape from the center of the bit mapping memory 25 to its peripheral part so as to bring forth an elliptic wipe effect, with the output of the first frame memory 22 being white and that of the second frame memory 23 black. As apparent from FIG. 2, the number of dots in the change-over area of the picture (edge part of an elliptic shape) increases and, thus, the amount of rewriting of the contents of the bit mapping memory 25 during the vertical blanking period greatly increases.

SUMMARY OF THE INVENTION

This invention is directed to the solution of the above-stated problems of the prior art. It is, therefore, an object of this invention to provide an image display apparatus which is arranged to greatly reduce the amount of information to be rewritten in real time so that a complex picture effect can be attained at a low cost.

Under the above-stated object, an image display apparatus arranged according to this invention to include a bit mapping memory having transparency parameter values and to display images wile imparting a picture effect to a plurality of image data on the basis of the transparency parameter values is provided with a code memory arranged to hold transparency parameter codes and a look-up table arranged to be used for converting the transparency parameter codes into the transparency parameter values. The image display apparatus is thus arranged to attain the picture effect by converting, through the look-up table, the transparency parameter codes into the transparency parameter values to be used for transparency between a plurality of images.

With the image display apparatus arranged to be provided with the code memory for holding the transparency parameter codes and the look-up table for converting the transparency parameter codes into the transparency parameter values according to this invention, the amount of information to be rewritten in real time can be greatly reduced by rewriting the contents of the look-up table during the process of bringing forth a picture change-over effect. This arrangement enables the apparatus to attain complex picture effects at a low cost.

The above and other objects and features of this invention will become apparent from the following detailed description of an embodiment thereof taken in connection with the accompanying drawings.

DETAILED DESCRIPTION OF THE PREFERRED EMBODIMENTS

Figure 3:
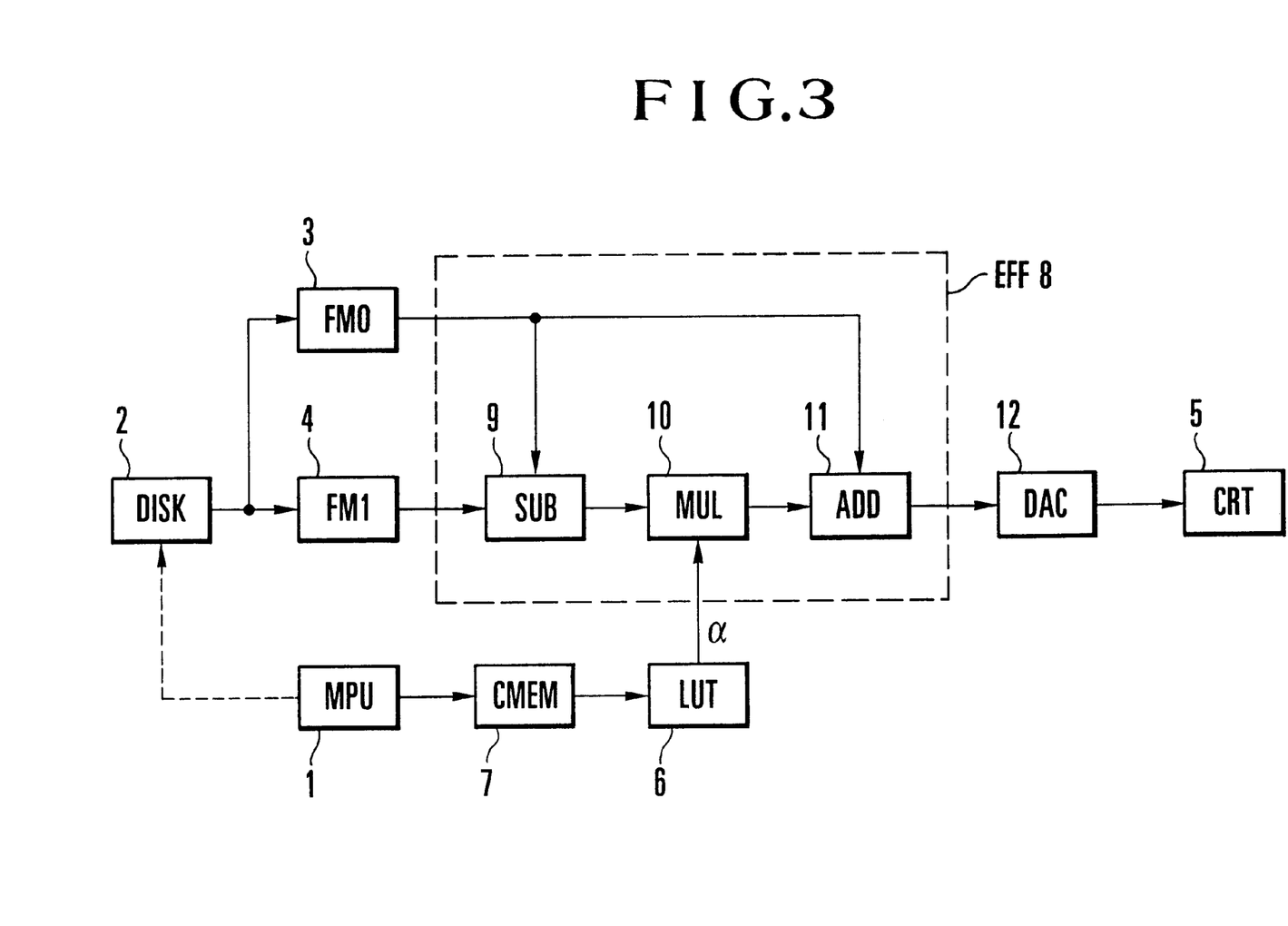
FIG. 3 is a block diagram showing an image reproducing apparatus which is arranged as an image display apparatus according to an embodiment of this invention.

An image display apparatus which is arranged according to this invention as an embodiment thereof is described below with reference to the drawings:

FIG. 3 shows in a block diagram a case where this invention is applied to a still image reproducing apparatus. Referring to FIG. 3, in the case of the still image reproducing apparatus, image data is read out from a disk 2 in accordance with instructions from control means (MPU) 1. The image data read out is written into a first frame memory (FM0) 3 and a second frame memory (FM1) 4.

The image data written in the frame memories 3 and 4 are read out according to a video display timing and are supplied through an effector (EFF) 8 to a D/A converter 12 so as to be converted into an analog signal and, after that, to be displayed on a CRT 5. A picture effect can be brought forth by the action of the effector 8 in accordance with the following procedures:

The effector 8 is composed of a first computing element (SUB) 9, a second computing element (MUL) 10 and a third computing element (ADD) 11 and is arranged to mix the image data read out from the two frame memories 3 and 4, within an arbitrary display area and in an arbitrary ratio, by carrying out the following computing operation on the image data read out from the two frame memories 3 and 4. Assuming that the output of the effector 8 is Y, process is carried out to have the output Y in a state expressed as follows:

$$Y = \alpha (FM1 - FM0) + FM0 = \alpha FM1 + (1 - \alpha) FM0$$

Prior to bringing forth a picture effect, the still image reproducing apparatus of this embodiment first makes all the values of a look-up table (LUT) 6 zero. The value of the transparency parameter a therefore remains at "0.0" irrespective of the value of a bit mapping memory 7 provided for transparency parameter codes. As a result, an image stored in the first frame memory 3 is displayed on the CRT 5.

Figure 4:
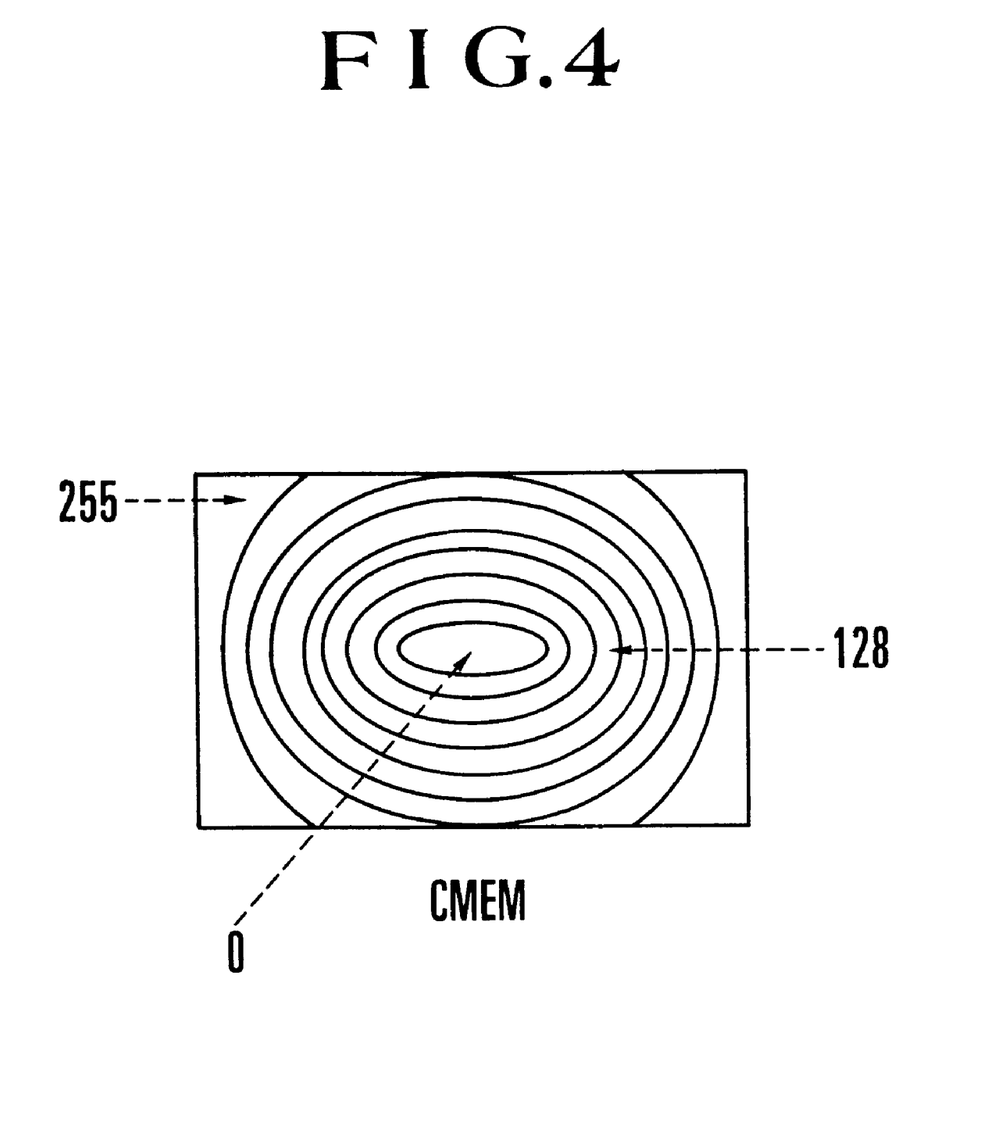
FIG. 4 shows the contents of a memory for storing picture transparency parameter codes to be used in bringing forth a concentric elliptic wipe.

Next, data is written into the transparency parameter code bit mapping memory 7 for a picture effect in accordance with the sequence of the picture effect. In a case where the concentric elliptic wipe effect mentioned in the description of the conventional arrangement is to be attained, the transparency parameter codes are beforehand written into the bit mapping memory 7 according to a variation of change-over at a certain timing, as shown in FIG. 4.

Figure 5:
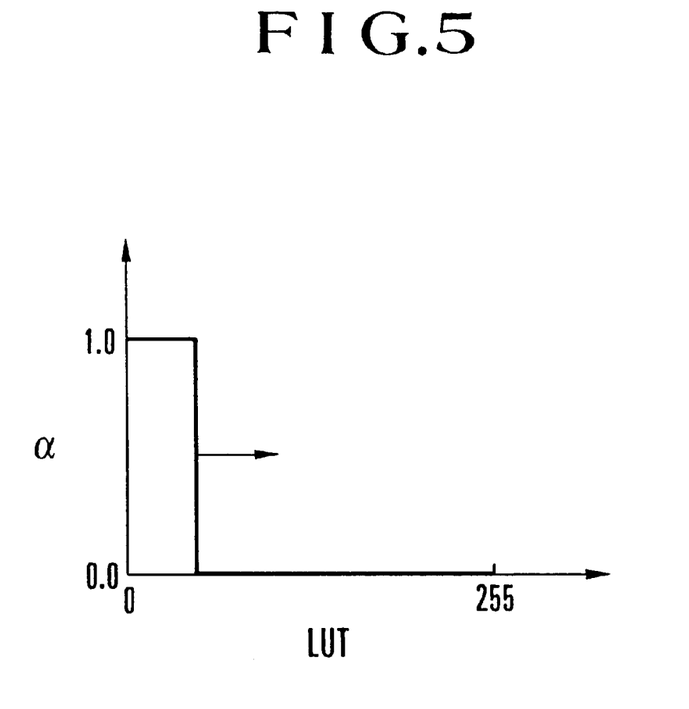
FIG. 5 shows changes of data included in a look-up table while the concentric elliptic wipe is in process.

While the picture effect is in process, the value of the look-up table (LUT) 6 is rewritten to "1.0" for the transparency parameter codes "0" to "255", starting with the code 0. FIG. 5 shows this rewriting for a certain number of codes. This rewriting continues gradually until the code 255 is rewritten. As a result, the value of the transparency parameter $\alpha$ comes to change to "1.0" gradually over the entire picture area beginning from the center of the picture. Therefore, the picture comes to gradually change over time from the output of the frame memory (FM0) 3 to the output of the frame memory (FM1) 4 from its inner side in a concentric elliptic shape.

This rewriting action enables the embodiment to keep at about one byte the amount of information to be rewritten for every vertical blanking period while the picture effect is in process. Further, in the case of the embodiment, the image data to be written into the first and second frame memories 3 and 4 are for still images. However, exactly the same picture effect can be attained even if the image data written into one of or both of the frame memories 3 and 4 are for moving images and not still images.

Figure 6:
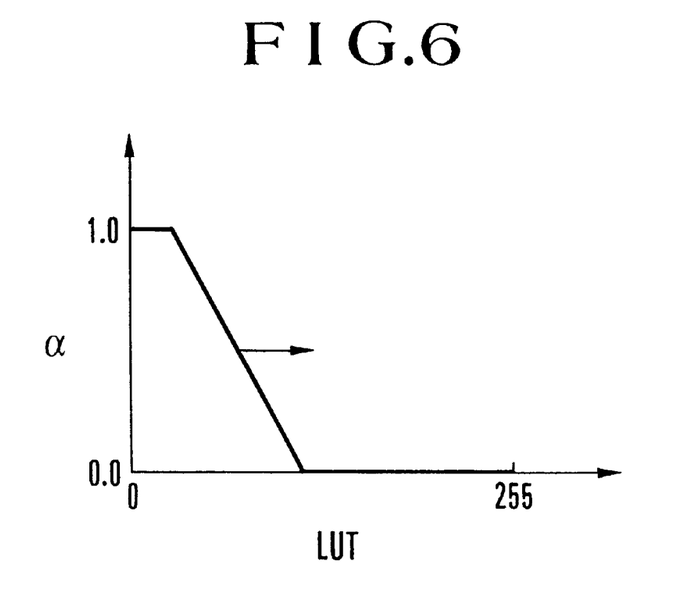
FIG. 6 shows changes of data included in the look-up table while a gradating concentric elliptic wipe is in process.
Figure 7:
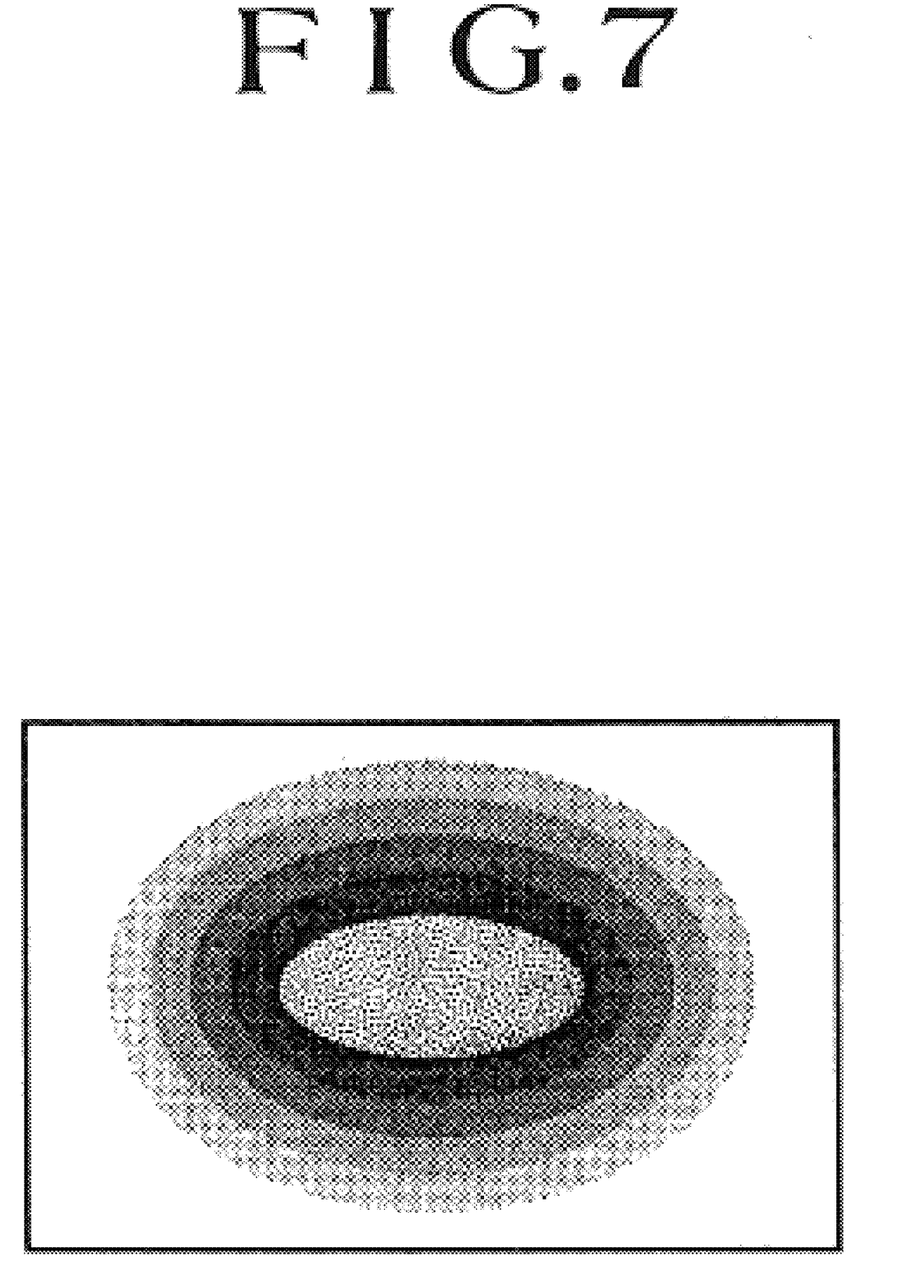
FIG. 7 shows the gradating concentric elliptic wipe.

FIG. 6 shows the contents of a look-up table 6 arranged as a second embodiment of this invention to bring forth a gradating concentric elliptic wipe effect as shown in FIG. 7. In the second embodiment, like the first embodiment described above, the output of the first frame memory 3 is white and that of the second frame memory 4 is black. The contents of the transparency parameter code bit mapping memory 7 are arranged also in the same manner as in the case of the first embodiment, and the value is again rewritten as "1" for the 0 code position first and, with time, is rewritten as "1" for the succeeding code positions.

In this case, however, as seen in FIG. 7, a gradating effect is imparted to a picture change-over area by rewriting the value of the transparency parameter $\alpha$ to an intermediate value in the change-over area. In this case, the amount of information which is to be rewritten in bringing forth the picture effect is several to scores of bytes. However, if the same effect is to be brought forth by the conventional system, an extremely large amount of data must be rewritten according to the sequence of the picture change-over process.

While this invention is applied to a still image reproducing apparatus in the case of the embodiment, this invention is applicable also to apparatuses of other kinds such as a still image retrieving apparatus which handles natural images, a still image filing system, a multimedia reproducing apparatus, a graphic workstation, a digital video effector, a video switcher, etc.

In accordance with the arrangement of the embodiments of this invention, an image display apparatus can be arranged with a relatively few hardware parts to bring forth a variety of effects for programs with a high degree of latitude.

What is claimed is:

1. A data processing apparatus, comprising:

processing means for processing input image data with parameter data;

memory means for storing code data into a plurality of memory areas, each of the plurality of memory areas being provided for a plurality of areas into which one picture of the input image data is divided, the code data having different values between the plurality of memory areas;

generating means for receiving the code data read out from said memory means and outputting the parameter data corresponding to the code data; and control means for changing values of the parameter data corresponding to the code data in the memory area unit.

2. An apparatus according to claim 1, wherein said image input data include first image data and second image data, said processing means compositing said first image data with said second image data by means of said parameter data.

3. An apparatus according to claim 2, wherein said parameter data represent a ratio of said first image data to said second image data when the first image data are composited with the second image data.

4. An apparatus according to claim 3, wherein said processing means has subtraction means for obtaining difference data between said first image data and said second image data, multiplying means for multiplying the difference data by a coefficient corresponding to the parameter data generated by said generating means and addition means for adding said second image data and an output from said multiplying means.

5. An apparatus according to claim 1, further comprising display means for displaying an image for the image input data which has been processed with said processing means.

6. An apparatus according to claim 1, wherein the values of said parameter data are changed for every vertical blanking period.

7. An apparatus according to claim 1, further comprising reproducing means for reproducing the input image data from a recording medium.

8. An apparatus according to claim 7, wherein said control means also controls a reproduction operation of said reproducing means.

9. A data processing apparatus, comprising:
a multiplexer for multiplexing first image data and second image data by using parameter data;
a memory for storing code data into a plurality of memory areas, each of the plurality of memory areas being provided for a plurality of areas into which one picture is divided, the code data having different values between the plurality of memory areas;
a table circuit for receiving the code data read out from said memory and outputting the parameter data corresponding to the value of the code data; and
a controller for changing values of the parameter data corresponding to the value of the code data in the memory area unit.

10. An apparatus according to claim 9, wherein the values of said parameter data are rewritten for every vertical blanking period.

11. A data processing apparatus, comprising:
processing means for processing input image data with parameter data;
assigning means for dividing one picture of the input image data into a plurality of areas and assigning code data to each of the plurality of areas so that the code data have different values between the plurality of areas;
generating means for receiving the code data assigned by said assigning means and outputting the parameter data corresponding to the value of the code data; and
control means for changing values of the parameter data corresponding to the code data in the area unit.

12. An apparatus according to claim 11, wherein said assigning means has memory means for staring the code data into a plurality of memory areas, each of which is provided for the plurality of areas.

13. An apparatus according to claim 11, wherein said generating means includes a table circuit for receiving the code data assigned by said assigning means and outputting the parameter data corresponding to the value of the code data.

14. An apparatus according to claim 11, further comprising reproducing means for reproducing the input image data from a recording medium.

15. An apparatus according to claim 11, wherein said image data include first image data and second image data, said processing means multiplexing said first image data and said second image data by means of said parameter data.

16. An apparatus according to claim 15, wherein said parameter data represent a ratio of said first image data to said second image data when said first image data are multiplexed with said second image data.

17. An apparatus according to claim 16, wherein said processing means has subtraction means for obtaining difference data between said first image data and said second image data, multiplying means for multiplying the difference data by a coefficient corresponding to the parameter data generated by said generating means and addition means for adding said second image data and an output from said multiplying means.

18. An apparatus according to claim 11, further comprising display means for displaying an image corresponding to the image data processed by said processing means.

19. An apparatus according to claim 11, wherein said processing means applies multiplication process to said input image data by using said parameter.

20. An apparatus according to claim 19, wherein said parameter is used as a coefficient in the multiplication process.

21. An apparatus according to claim 19, wherein said processing means has a memory for memorizing said input image data, and applies multiplication process to said input image data read from said memory.

22. An apparatus according to claim 11, wherein said control means causes values of parameters corresponding to said plural areas to gradually change.

23. A data processing method, comprising:
processing input image data with parameter data;
dividing one picture of the input image data into a plurality of areas and assigning code data to each of the plurality of areas so that the code data have different values between the plurality of areas;
receiving the code data assigned by said assigning step and outputting the parameter data corresponding to the value of the code data; and
changing values of the parameter data corresponding to the code data in the area unit.

24. The method according to claim 23, wherein said image data include first image data and second image data, said processing step including multiplexing said first image data and said second image data by said parameter data.

25. The method according to claim 24, wherein said parameter data represent a ratio of said first image data to said second image data when said first image data are multiplexed with said second image data.

26. The method according to claim 23, further comprising displaying an image corresponding to the image data processed in said processing step.

27. The method of claim 23, wherein said processing step applies multiplication process to said input image data by using said parameter.

28. The method according to claim 27, wherein said parameter is used as a coefficient in the multiplication process.

29. The method according to claim 27, wherein said processing step includes memorizing said input image data, and applies multiplication process to said memorized input image data.

30. The method according to claim 23, wherein said step of changing causes values of parameters corresponding to said plural areas to gradually change.

* * * * *

UNITED STATES PATENT AND TRADEMARK OFFICE
CERTIFICATE OF CORRECTION

PATENT NO. : 5,959,618
DATED : September 28, 1999
INVENTOR(S) : Ikuo Watanabe It is certified that error appears in the above-identified patent and that said Letters Patent are hereby corrected as shown below:

Col. 1, line 30, delete "parameter a" and insert -- parameter $\alpha$ --.
Col. 3, line 41, delete "parameter a" and insert -- parameter $\alpha$ --.
Col. 5, line 50, delete "staring" and insert -- storing --.

Signed and Sealed this

Tenth Day of April, 2001

Attest:

NICHOLAS P. GODICI

Attesting Officer     Acting Director of the United States Patent and Trademark Office